/ USA005535714A

United States Patent [19] [11] Patent Number: 5,535,714
Aoyama et al. [45] Date of Patent: Jul. 16, 1996

| [54] | CYLINDER HEAD ARRANGEMENT FOR MULTI-VALVE ENGINE |
|---|---|
| [75] | Inventors: Tateo Aoyama; Masahiro Uchida, both of Iwata, Japan |
| [73] | Assignee: Yamaha Hatsudoki Kabushiki Kaisha, Iwata, Japan |
| [21] | Appl. No.: 363,412 |
| [22] | Filed: Dec. 23, 1994 |
| [30] | Foreign Application Priority Data |

Dec. 29, 1993 [JP] Japan .................................. 5-353188

[51] Int. Cl.⁶ .................................................. F02B 29/00
[52] U.S. Cl. .................................................. 123/193.5
[58] Field of Search ........................... 123/193.5, 193.3, 123/90.27, 432, 308, 302

[56] References Cited

U.S. PATENT DOCUMENTS

| 4,593,657 | 6/1986 | Aoi et al. ............................ 123/193.5 |
| 4,612,885 | 9/1986 | Yoshikawa ........................... 123/90.27 |
| 4,624,222 | 11/1986 | Yoshikawa ........................... 123/90.27 |
| 4,637,356 | 1/1987 | Kuroda ................................ 123/90.27 |
| 4,637,357 | 1/1987 | Ohmi .................................... 123/90.27 |
| 4,641,609 | 2/1987 | Tanaka ................................. 123/193.5 |
| 4,679,532 | 7/1987 | Aoi et al. ............................ 123/90.27 |
| 4,685,429 | 8/1987 | Oyaizu ................................. 123/90.27 |
| 4,809,663 | 3/1989 | De Tomaso . |
| 5,094,193 | 3/1992 | Yoshikawa . |
| 5,099,812 | 3/1992 | Yamada ................................ 123/432 |
| 5,111,791 | 5/1992 | Onodera .............................. 123/90.27 |
| 5,408,958 | 4/1995 | Esch et al. .......................... 123/90.27 |

FOREIGN PATENT DOCUMENTS

| 0408080 | 1/1991 | European Pat. Off. . |
| 2133834 | 8/1984 | United Kingdom . |

OTHER PUBLICATIONS

European Search Report dated Apr. 11, 1995.

*Primary Examiner*—Marguerite McMahon
*Attorney, Agent, or Firm*—Knobbe, Martens, Olson & Bear

[57] ABSTRACT

A V-type multi-valve twin overhead cam shaft internal combustion engine and induction system therefor. The cylinder heads of the engine are formed as a unitary assembly for supporting the valves, the tappets that actuate the valves and the overhead cam shafts.

20 Claims, 18 Drawing Sheets

5,535,714

CYLINDER HEAD ARRANGEMENT FOR MULTI-VALVE ENGINE

BACKGROUND OF THE INVENTION

This invention relates to a cylinder head arrangement for a multi-valve engine, and more particularly to an improved unitary cylinder head casting for an engine.

In internal combustion engines, it is well known that the performance of the engine can be improved by increasing the number of valves per cylinder. For this reason, four valve per cylinder engines are quite common, particularly in high-performance engines. However, the use of five valves per cylinder to improve engine performance is now being widely accepted.

One difficulty with a five valve per cylinder engine is that the cylinder head assembly becomes quite complicated. In addition to the sliding support for the individual valves, normally these engines employ two overhead camshafts per cylinder bank. The valves are directly actuated by thimble tappets that are interposed between the individual camshafts and the valves which they actuate. The tappets and camshafts are also supported by the cylinder head. Because of the complexity of these cylinder head assemblies, it has been frequently the practice to utilize a multi-part cylinder head assembly. However, such multi-part cylinder head assemblies present problems in and of themselves.

With a multi-valve assembly, the individual components of the cylinder head must be machined, and these machined surfaces then must be assembled together. This obviously increases the number of fasteners that must be employed in the head assembly and also makes the placement of the fasteners that fix the head assembly to the block more difficult.

It is, therefore, a principal object of this invention to provide an improved unitary cylinder head for an internal combustion engine.

It is a further object of this invention to provide a unitary cylinder head for a multi-valve twin overhead camshaft internal combustion engine.

It is a further object of this invention to provide a cylinder head for a multi-valve engine, wherein the cylinder head itself reciprocally supports the valves, the tappets that actuate the valves, and the camshafts that operate the tappets.

SUMMARY OF THE INVENTION

This invention is adapted to be embodied in a cylinder head for a multi-valve internal combustion engine having a lower surface for sealing engagement with a cylinder block around a cylinder bore. An upper surface is spaced from the cylinder head and defines on one side of a longitudinally extending plane containing the axis of the cylinder bore a first set of three tappet-receiving bores, each adapted to slidably receive a respective tappet for actuating a respective valve serving the cylinder bore. A first wall upstands from the cylinder head upper surface and encircles the first set of tappet-receiving bores. A second set of two tappet-receiving bores is formed in the cylinder head on the other side of the plane for slidably receiving respective tappets for actuating respective valves serving the cylinder bore. A second wall upstands from the cylinder head upper surface and encircles the second set of tappet-receiving bores.

DETAILED DESCRIPTION OF THE PREFERRED EMBODIMENTS OF THE INVENTION

Figure 1:
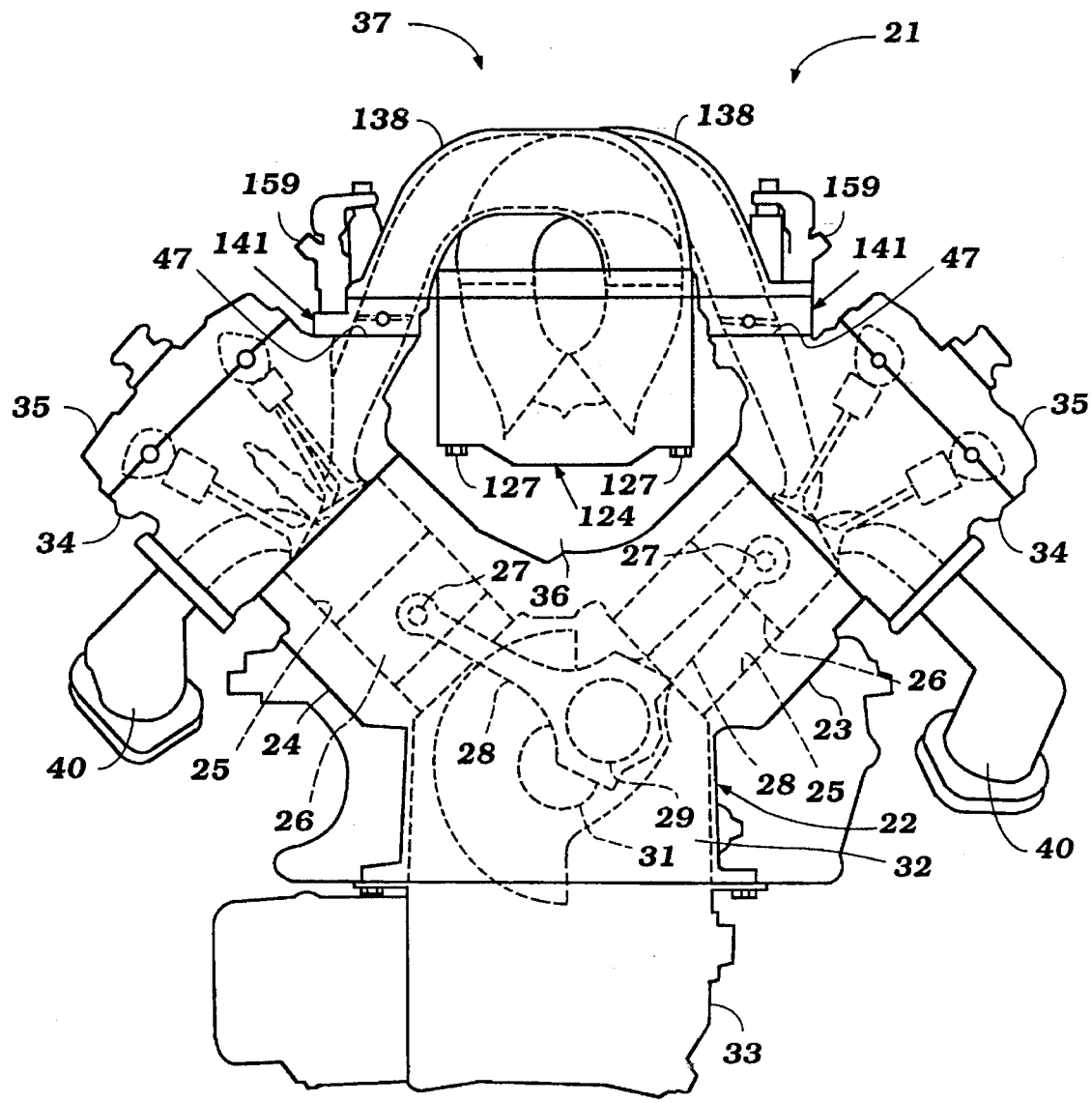
FIG. 1 is a front elevational view of an internal combustion engine constructed in accordance with an embodiment of the invention.

Referring now in detail to the drawings and initially to FIG. 1, an internal combustion engine constructed in accordance with an embodiment of the invention is indicated generally by the reference numeral 21. As will become apparent, the engine 21 is of the V-8 type and operates on a four-stroke principle. Although the invention is described in conjunction with such an engine, it will be readily apparent to those skilled in the art that certain facets of the invention may- be employed with-engines having other cylinder numbers and other cylinder configurations. It is believed well within the scope of those skilled in the art to understand how the features of the invention may be employed with such other engines.

The engine 21 is comprised of a cylinder block, indicated generally by the reference numeral 22, having two angularly inclined cylinder banks 23 and 24, each of which is formed with four respective cylinder bores 25. In the illustrated embodiment, the angle between the cylinder banks 23 and 24 is 90°.

Pistons 26 are slidably supported within each of the cylinder bores 25. These pistons 26 are connected by means of piston pins 27 to the upper or small ends of respective connecting rods 28. As is typical with V-type engine practice, the cylinder bank 23 is staggered slightly in an axial direction relative to the cylinder bank 24 so that the connecting rods 28 of respective cylinders of the banks 23 and 24 can be journaled on common throws 29 of a crankshaft 31. The crankshaft 31 is rotatably journaled in a well-known manner within a crankcase chamber formed by a skirt 32 of the cylinder block 22 and a crankcase member 33 that is detachably affixed thereto in a known manner.

The construction of the cylinder block 22 and those components which are contained within it and the crankcase member 33 may be considered to be conventional. Since the invention deals primarily with the cylinder head assemblies, now to be described, further details of the construction of the lower portion of the engine is not believed to be necessary to permit those skilled in the art to practice the invention. For that reason, further description of these conventional components will not be made.

Cylinder heads 34 are affixed to each of the cylinder banks 23 and 24 in a manner which will be described. Also, the detailed construction of the cylinder heads 34 and the mechanisms contained therein will be described by reference to the later figures. Cam covers 35 are affixed to the cylinder heads 34 in a manner which will also be described.

It should be noted that the cylinder banks 23 and 24 and the attached cylinder heads 34 and attached cam covers 35 define a valley between them, which valley is indicated generally by the reference numeral 36. An induction system, indicated generally by the reference numeral 37 and which also will be described later in more detail by reference to the remaining figures, is disposed in this valley 36 for supplying a fuel-air charge to the individual combustion chambers of the engine 21.

Exhaust manifolds 40 are affixed to the outer sides of the cylinder heads 34 and discharge the exhaust gases to the atmosphere through any conventional type of exhaust system (not shown).

The configuration of the combustion chambers for the invention will now be described by primary reference to FIGS. 2–4. It should be initially noted that the cylinder heads 34 for each of the cylinder banks 23 and 24 are substantially identical in construction, with the cylinder head 34 for the bank 23 being placed onto the bank 23 in the configuration as shown in FIG. 4. When the same cylinder head 34 is attached to the cylinder bank 24, the head 34 will be reversed from the position shown in FIG. 4. This permits the use of a single casting for both sides of the engine 21 with obvious cost advantages.

The cylinder head 34 has a lower sealing surface 38 that is affixed to the upper end of the respective cylinder block 23 or 24 in a manner which will be described so as to effect a tight gas seal therewith. The cylinder head surface 38 is provided with individual recesses 39 which cooperate with the cylinder bores 25 and the heads of the pistons 26 to form the combustion chambers for the engine 21. In a preferred form, the combustion chambers have a generally lens-shaped configuration, as described in the copending application of Masaaki Yoshikawa, entitled "Engine Combustion Chamber and Air Intake Device," Ser. No. 08/354,536, filed Dec. 13, 1994 and assigned to the assignee hereof. Where any details of the combustion chamber configuration are not described herein, reference may be had to that copending application, the disclosure of which is incorporated herein by reference, for such details.

The axes of the individual cylinder bores 25 are indicated in certain of the figures and identified by the reference numeral 41 for orientation purposes. On one side of a plane containing the cylinder bore axis 41 there is provided a center intake valve seat 42, and this appears in FIG. 2 at the left-hand side of the figure and also on a larger scale in FIG. 3. This intake valve seat 42 is disposed generally on the outer periphery of the cylinder bore 25 and is spaced the greatest distance from the cylinder bore axis 41.

A further, pair of side intake valve seats 43 are disposed closer to the cylinder bore axis 41, but are positioned so as to extend in part across the aforenoted plane containing the cylinder bore axis 41.

Respective poppet-type intake valves 44 are slidably supported in the cylinder head 34 by pressed or cast-in guides 45 and control the flow through the valve seats 42 and 43. The reciprocal axis of the intake valve 44 associated with the center valve seat 42 is disposed at an acute angle $\theta_c$ to a plane 46, which plane is parallel to the cylinder bore axis 41 and to the aforenoted plane containing it. This plane 46 is offset from the plane containing the cylinder bore axis 41 toward the valley 36 between the cylinder banks 23 and 24.

The intake valves 44 associated with the side intake valve seats 42 have their reciprocal axes lying in a common plane. This plane is also disposed at an acute angle to the plane 46 and the plane for containing the axis 41. This acute angle, indicated by the dimension $\theta_s$, is greater than the acute angle $\theta_c$.

An intake passage arrangement, indicated generally by the reference numeral 46, extends from outer surfaces 47 of the cylinder heads 34 on the side adjacent the valley 36 and is served by the intake system 37 in a manner which will be described. The intake passage arrangement 46 in this embodiment includes a first Siamesed-type intake passage 48 that serves the center intake valve seat 42 and one of the side intake valve seats 43. In addition, a further intake passage 49 extends from the cylinder head surface 47 and terminates at the remaining side intake valve seat 43.

Figure 6:
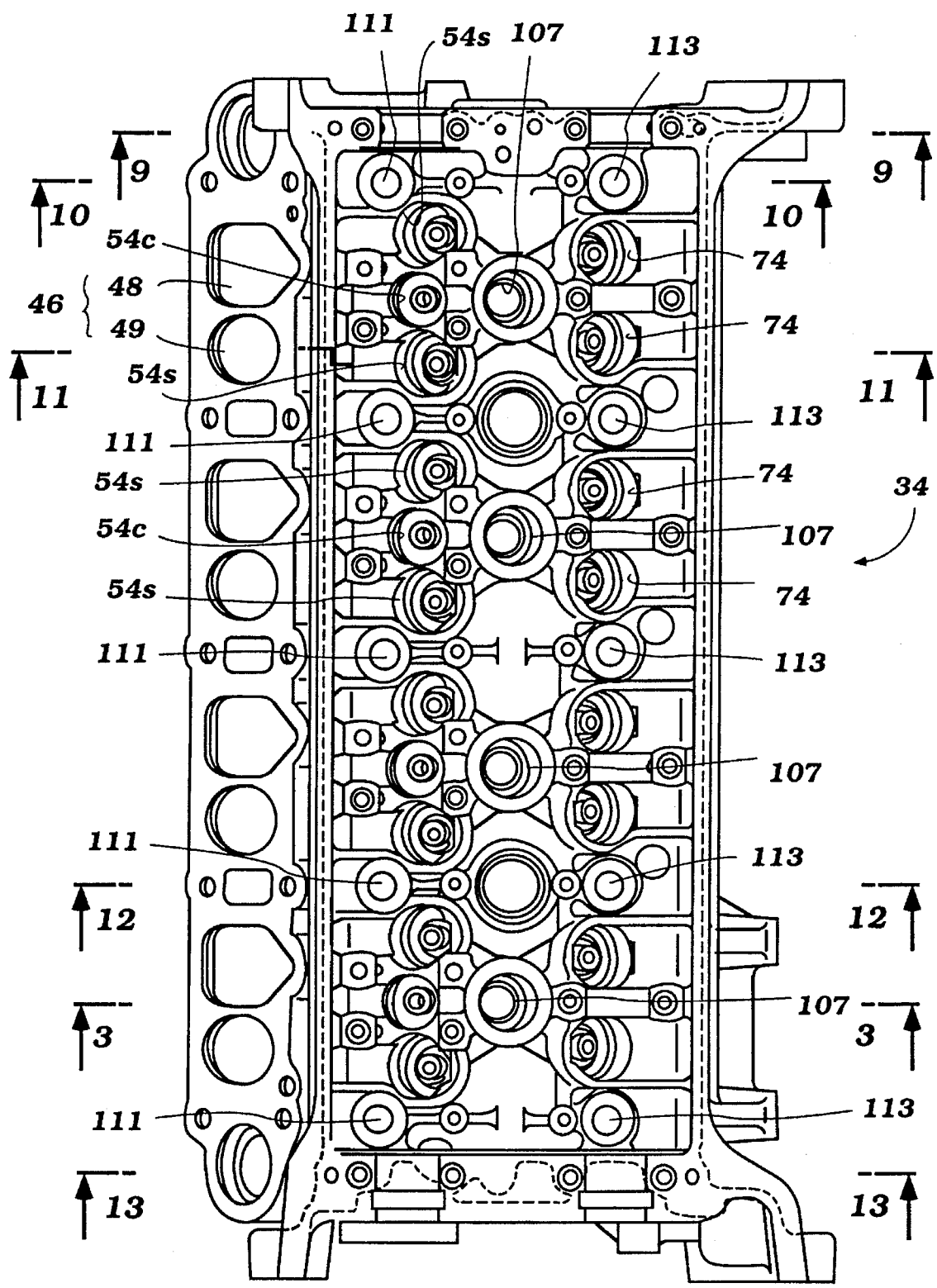
FIG. 6 is a top plan view, in part similar to FIG. 5, but shows the cylinder head with the camshafts and the drives therefor removed and is on a larger scale than FIG. 5.
Figure 7:
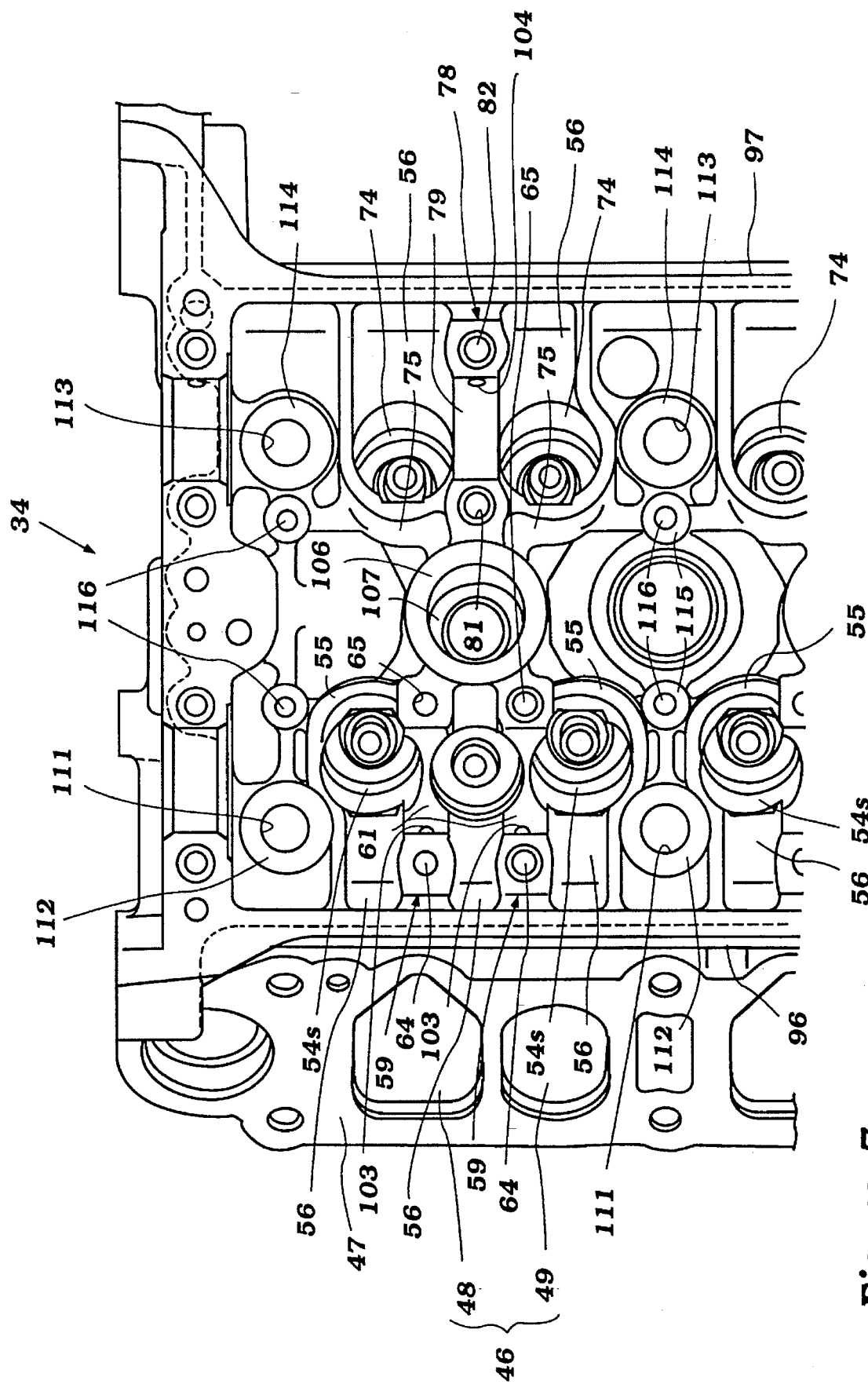
FIG. 7 is a still further enlarged view of the area adjacent the rear end of the cylinder head.
Figure 8:
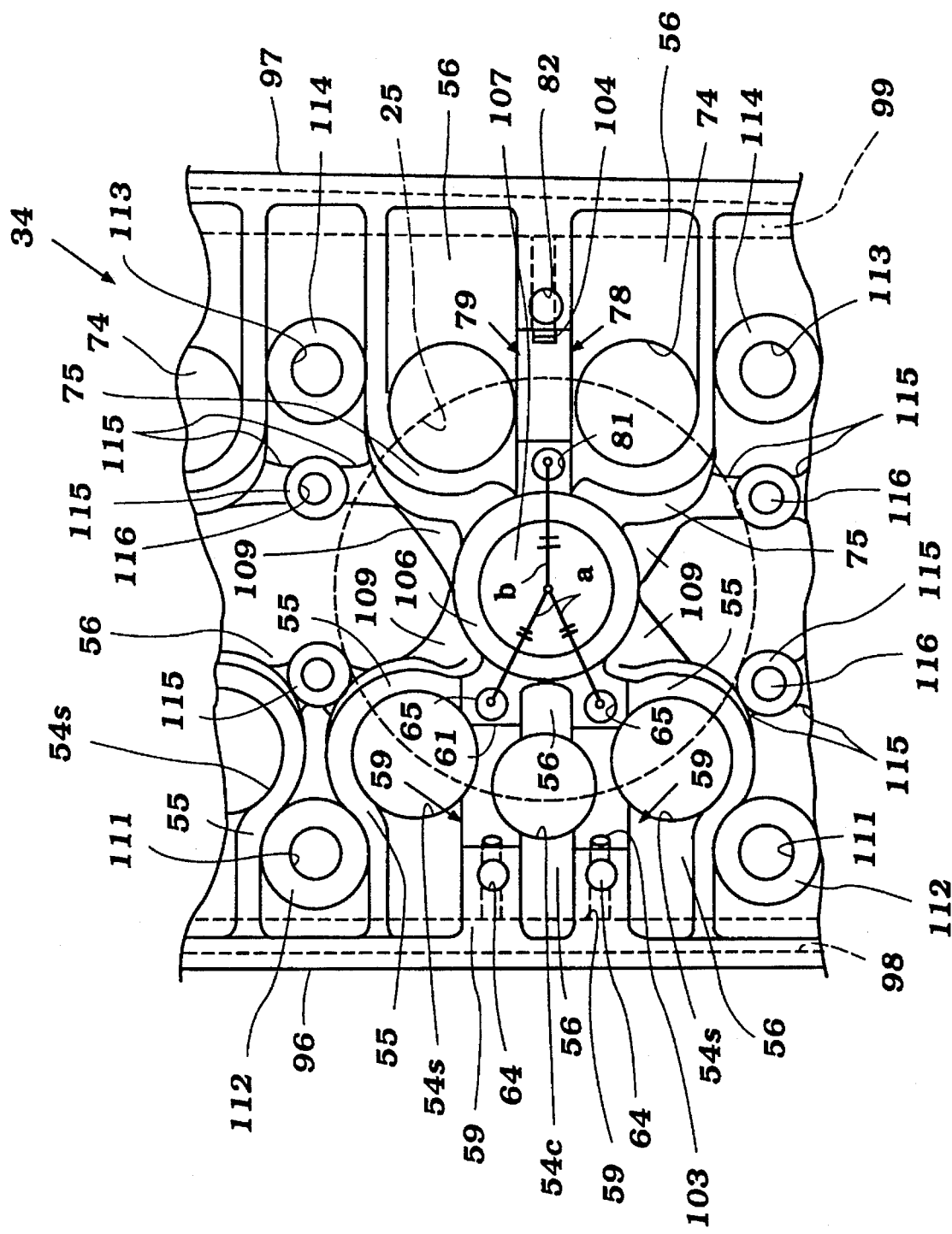
FIG. 8 is a further enlarged view of the cylinder head with the components removed and showing the arrangement adjacent one of the cylinder bores.

Coil compression springs 51 encircle the stems of the intake valves 44 and bear against machined surfaces on the cylinder head 34 and keeper retainer assemblies 52 fixed to the upper ends of the stems of the valves 44 for urging the valves 44 to their closed positions. Thimble tappets 53 are slidably supported in tappet-receiving bores 54 formed in the cylinder head 34 for actuating the valves 44. The bores 54, as may be best seen in FIGS. 6–8, are disposed at the same angle as the reciprocal axes of their respective valve stems 44. The bores 54 associated with the side intake valve seats 43 are indicated at 54s, while those associated with the center intake valve seat 42 are indicated by the reference character 54c.

As may be best seen in FIGS. 6–8, the portion of the cylinder head in which the tappet-receiving bores 54 for each cylinder are formed is surrounded by an upstanding wall, indicated by the reference numeral 55. This wall 55 extends upwardly beyond the upper cylinder head surface 56 in which the tappet-receiving bores 54 are formed.

An intake camshaft, indicated generally by the reference numeral 57, is rotatably supported in the cylinder head 34 in a manner which will be described. This intake camshaft 57 is driven in a manner which will also be described at one-half crankshaft speed. The intake camshaft 57 is provided with three cam lobes 58 for each cylinder which it serves and which are spaced apart by bearing surfaces. These bearing surfaces are, in turn, journaled in the cylinder head 54 in bearings formed integrally in the cylinder head, and specifically in raised walls 59 thereof. As may be clearly seen in FIG. 8, these walls 59 extend transversely across the area between the surrounding wall 55 and the inner peripheral edge of the cylinder head 34. These walls 59 are spaced vertically upwardly of the lower cylinder head surface 38, and their bearing surfaces 61 appear in most detail in FIGS. 9 and 10, although they also appear in other of the figures. The corresponding bearing surfaces of the intake camshaft 57 also appear in FIG. 10 and are identified by the reference numeral 62.

Bearing caps 63 (FIGS. 2 and 3) are affixed to the cylinder head surfaces 59 for rotatably journaling the intake camshaft 57. Pairs of tapped openings 64 and 65 are formed on opposite sides of the bearing surfaces 61. Threaded fasteners 66 are screwed into these threaded openings 64 and 65 to fix the bearing cap 63 in place and rotatably journal the intake camshaft 57. The way in which the camshaft bearing surfaces 62 are lubricated will be described later.

Figure 2:
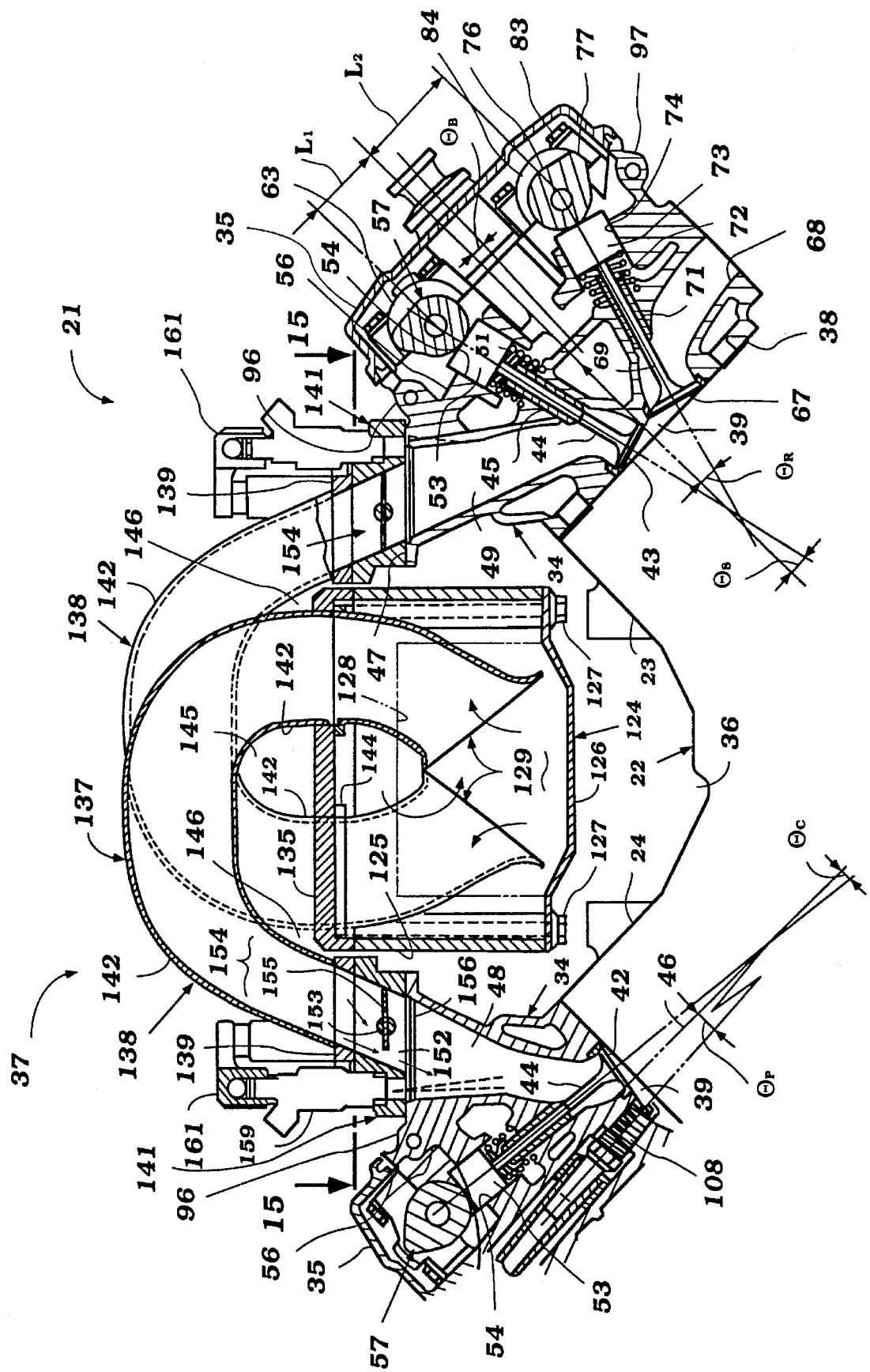
FIG. 2 is a partial cross-sectional view taken through the cylinder head and induction system for the engine along a plane that extends transversely and which passes through one cylinder bore of each bank.
Figure 3:
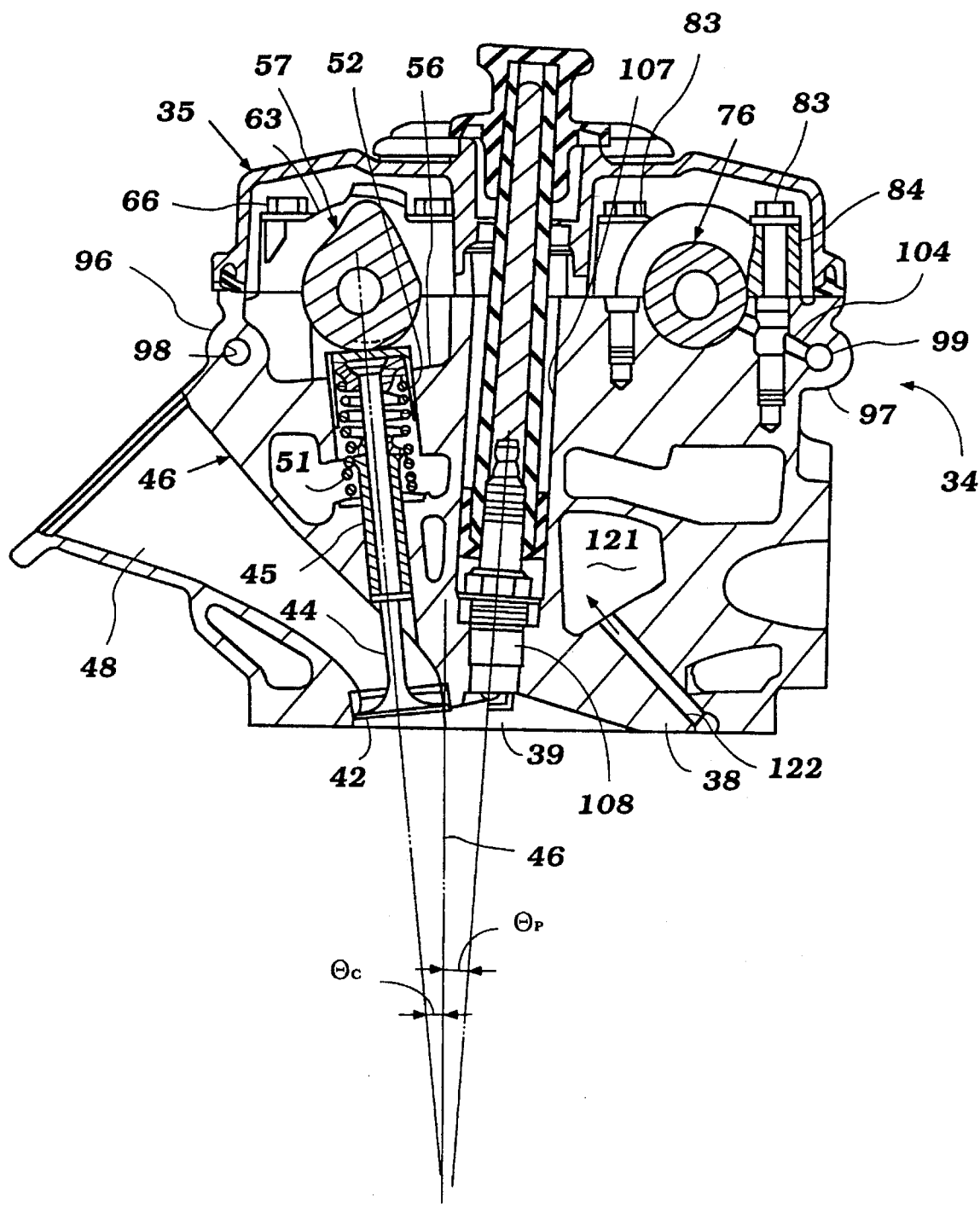
FIG. 3 is an enlarged cross-sectional view taken along a plane spaced axially from the plane of FIG. 2 and which actually passes through the center of the cylinder bore, whereas the plane of FIG. 2 is offset from the axis of the cylinder bores.
Figure 4:
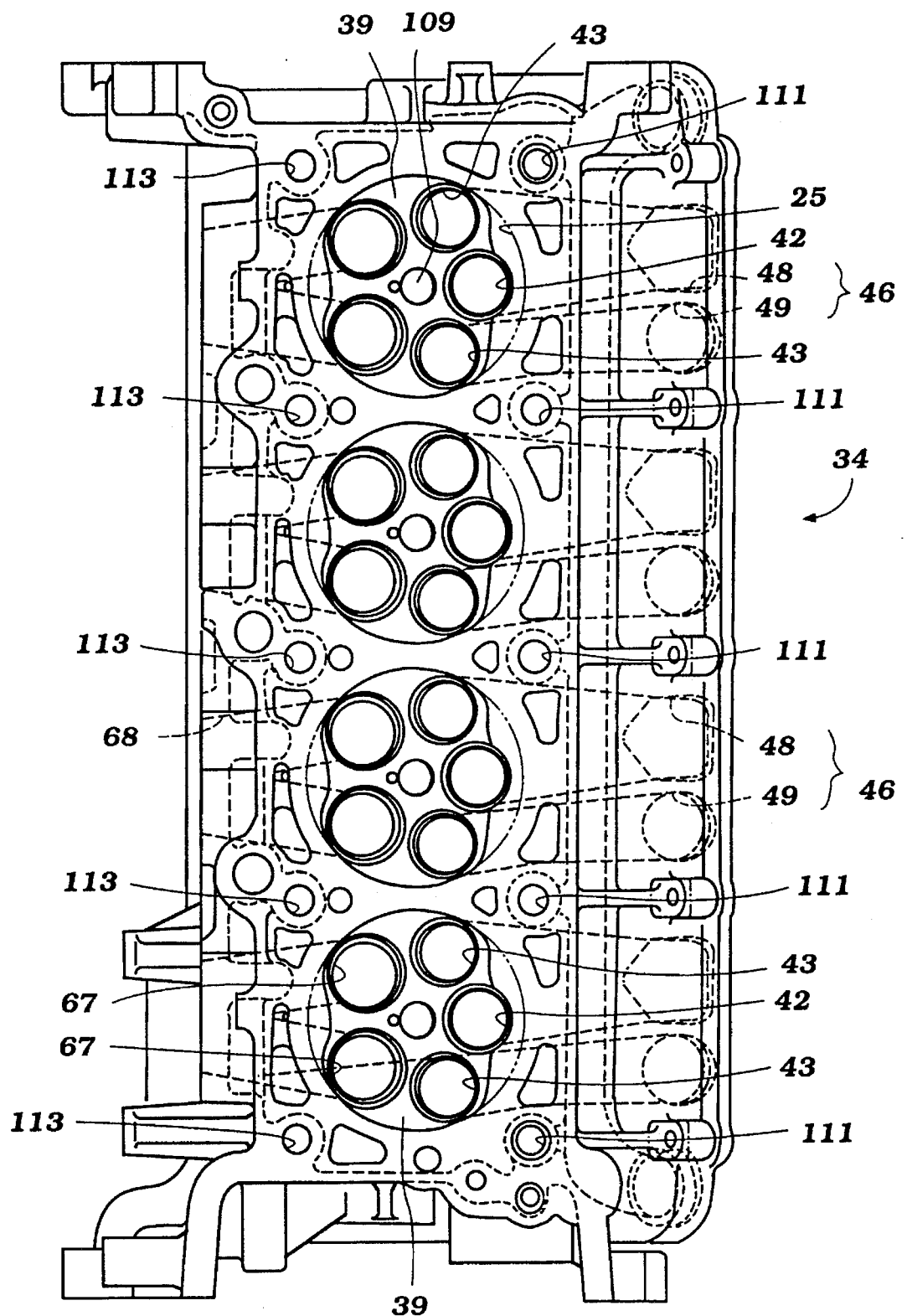
FIG. 4 is a bottom plan view of one of the cylinder heads with the valves removed.
Figure 5:
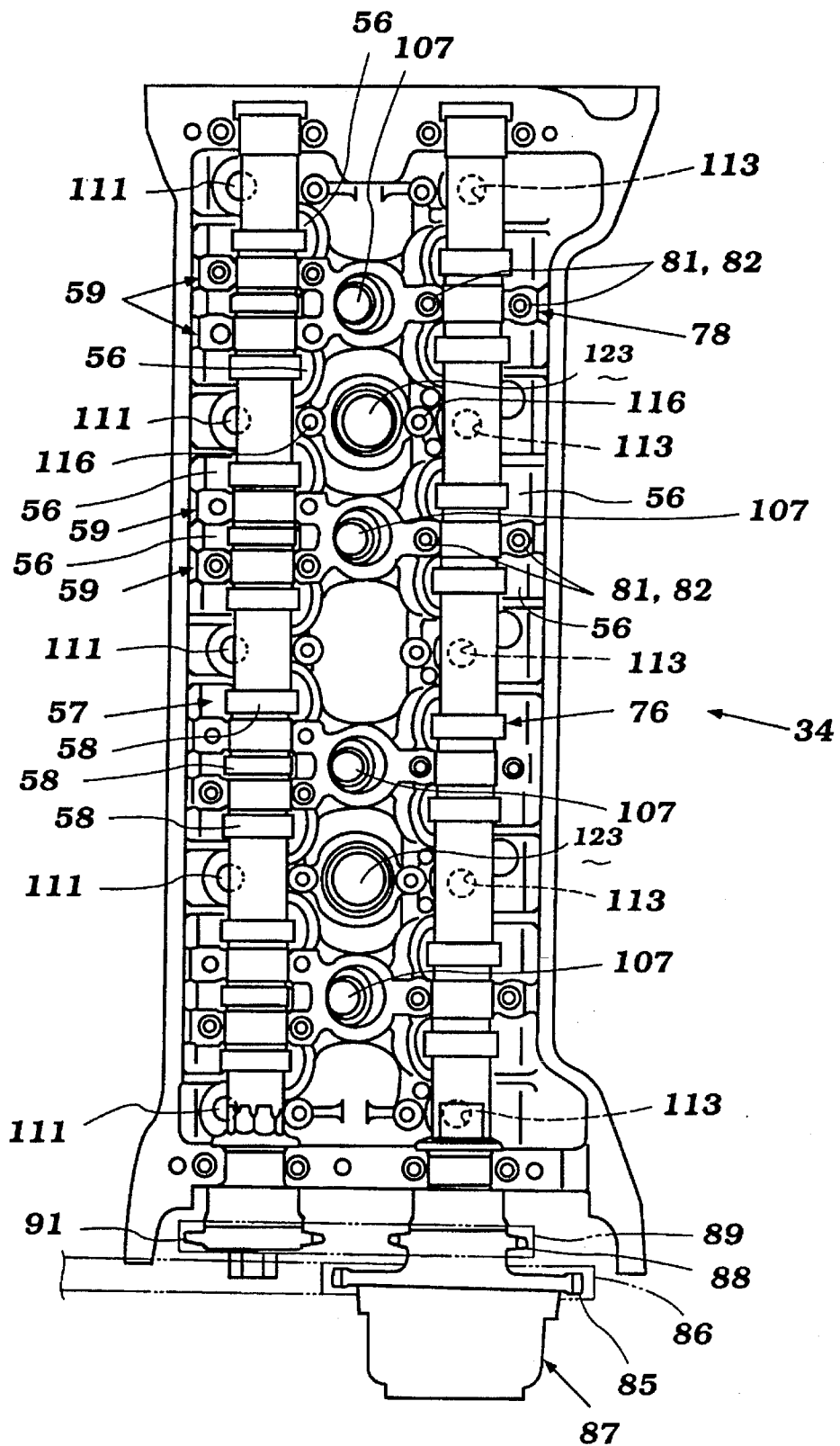
FIG. 5 is a top plan view of the cylinder head with the cam cover, bearing caps, and spark plugs removed.

Referring now primarily to FIGS. 2 and 3, a pair of exhaust valve seats 67 are formed in the cylinder head recesses 39 on the side of the plane 41 opposite to the center intake valve seat 42. These side exhaust valve seats 67 are formed at the beginning of exhaust passages 68, which extend through the exhaust side of the cylinder heads 34 and which terminate at the exhaust manifolds 38 previously referred to and illustrated in FIG. 1. The exhaust passages 68 may be of the Siamesed type, or if preferred, individual passages may be employed for each exhaust valve seat 67.

Exhaust valves 69 are slidably supported for reciprocation in the cylinder head 34 by valve guides 71 that are inserted into the cylinder head 34 in any suitable manner. The axes of reciprocation of the exhaust valves 69 lie in a common plane that is disposed at an angle $\theta_e$ to the plane containing the cylinder bore axis 41. The angle $\theta_e$ is less than or equal to the angle $\theta_s$ of the side intake valves and substantially greater than the angle $\theta_c$ of the center intake valve.

Coil compression springs 72 encircle the stems of the exhaust valves 69 and act upon keeper retainer assemblies for urging these valves to their closed position in seating engagement with the valve seat 67.

Referring now to FIGS. 2 and 5–8, the exhaust valves 69 are opened by thimble tappets 73 that are slidably supported in bores 74 formed in the cylinder head 34. The bores 74 extend parallel to the axes of reciprocation defined by the valve guides 71 and extend downwardly from the cylinder head surface 56. An upstanding wall 75 encircles the area of the cylinder head surface 56 around the tappet-receiving bores 74.

An exhaust cam shaft 76 is provided that has individual cam lobes 77 that engage each of the exhaust valve tappets 73 for operating them. The exhaust cam shaft 76 is journaled in the cylinder head 34 by means of a plurality of cam shaft supporting walls 78 that extend from the outer peripheral edge of the cylinder head 34 on the exhaust side and which terminate at and blend into the upstanding wall 75. Each wall 78 is formed with an arcuate bearing surface 79 that rotatably journals a bearing surface of the exhaust cam shaft 76 formed between its lobes 77.

Each of the bearing supporting walls 78 is formed with a pair of spaced apertures 81 and 82 that receive threaded fastening means 83 for affixing bearing caps 84 to the walls 78 and completing the journaling of the exhaust cam shaft 76.

As is well known in this art, the intake and exhaust cam shafts 57 and 76 are driven from the engine crankshaft 31 at one-half crankshaft speed. Although any of a wide variety of types of cam shaft drives may be employed, in the illustrated embodiment, one cam shaft of each cylinder head 54 of each of the cylinder banks 23 and 24 is directly driven by the crankshaft 31 as by means of a flexible transmitter, shown in phantom lines in FIG. 5 and identified by the reference numeral 85. This flexible transmitter is depicted as being a chain drive but it is to be understood that this drive could be by a toothed belt or the like.

The timing chain 85 drives a sprocket 86 of a variable valve timing mechanism 87 which, in turn, drives a sprocket 88 that is fixed for rotation with the exhaust cam shaft 76. The exhaust cam shaft sprocket 88 drives a further flexible driving belt or chain 89 which, in turn, drives a sprocket 91 affixed to the adjacent end of the intake cam shaft 57.

The method of lubricating the cam shaft bearing surfaces for both the intake cam shaft 57 and the exhaust cam shaft 76 will now be described by particular reference to FIG. 9 although, as will be readily apparent, certain portions of the lubricating system also appear in the other figures.

Figure 13:
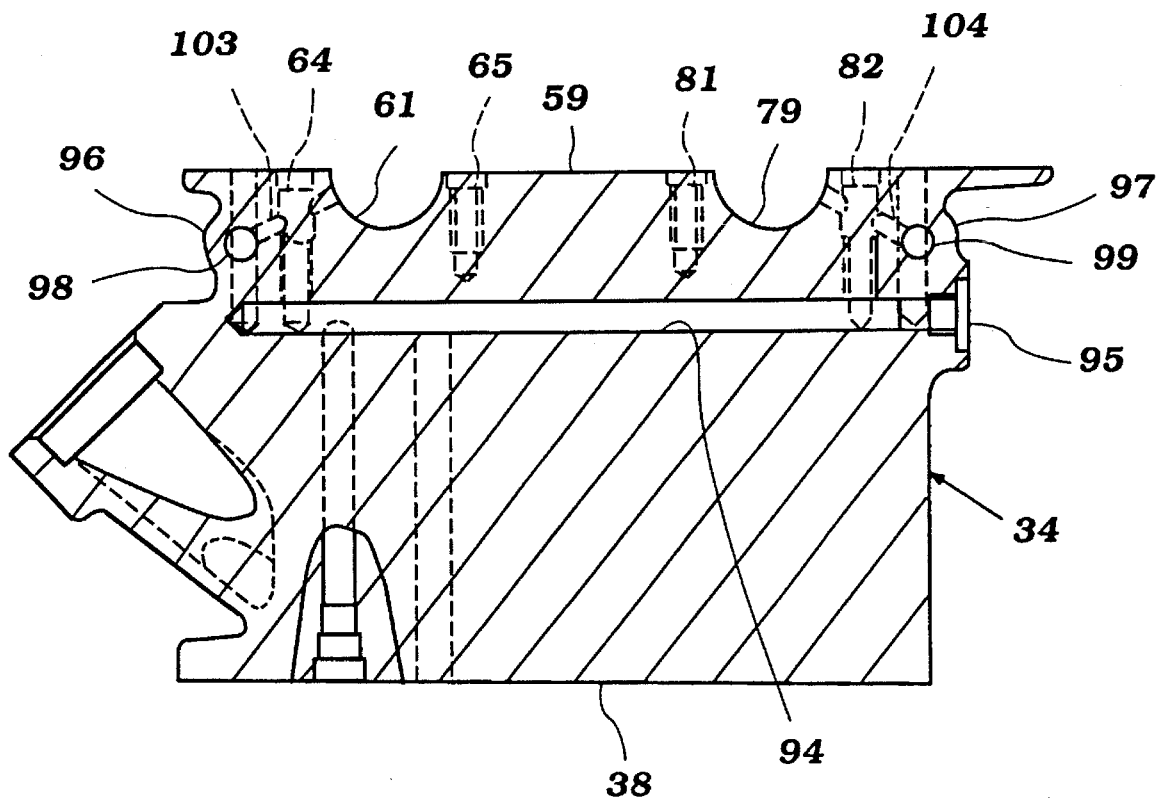
FIG. 13 is an enlarged cross-sectional view taken along the line 13—13 of FIG. 6.
Figure 14:
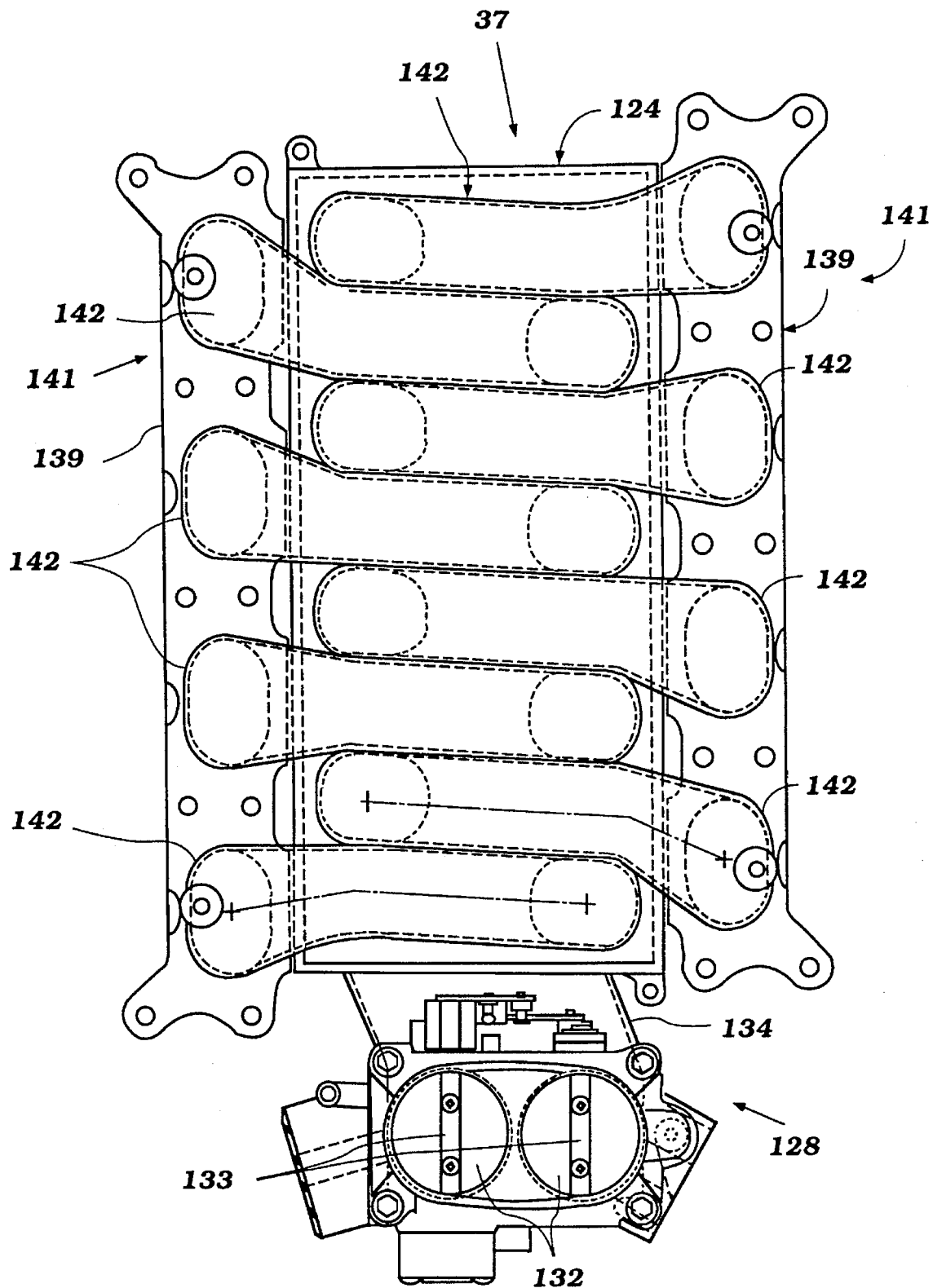
FIG. 14 is a top plan view of the intake manifold and throttle control for the engine.

On the exhaust or outer side of each cylinder head 34 there is provided a main oil supply passage 92 that is drilled upwardly from the surface 38 and which has a counterbored inlet end 93 that is adapted to receive lubricant from the lubricating system of the cylinder block through a suitable passage. At is upper end, the passageway 92 is intersected by a transversely extending passageway 94 which is drilled through the exhaust side of the cylinder head 34 and which is closed after drilling by the insertion of a plug 95. The outer surface of the cylinder head 34 is provided with a pair of bosses 96 and 97 (FIG. 13) adjacent which longitudinally extending drilled galleries 98 and 99 are formed. One or both ends of the drilled passageways 98 and 99 are closed by closure plugs. The galleries 98 and 99 communicate with the cross drilling 94 through a pair of drillings 101 and 102 that extend downwardly from the upper surface of the cylinder head 34 and which are normally closed by the cam cover 35.

The walls 56 and 78 in which the bearing surfaces 61 and 79 are formed are cross drilled at 103 and 104 with these cross drillings extending from the respective bearing surfaces 61 and 79 into the main galleries 98 and 99. These pass through the upper end of the fastener receiving hole 64 and 82 that receive the aforenoted fasteners for holding bearing caps 63 and 84 in place.

A further cross drilling 105 is formed in the outer surface of the cylinder head 34 on the exhaust side and intersects the main drilling 92. This drilling 105 supplies lubricant under pressure to a chain tensioner for one or both of the aforenoted chain drives.

Figure 9:
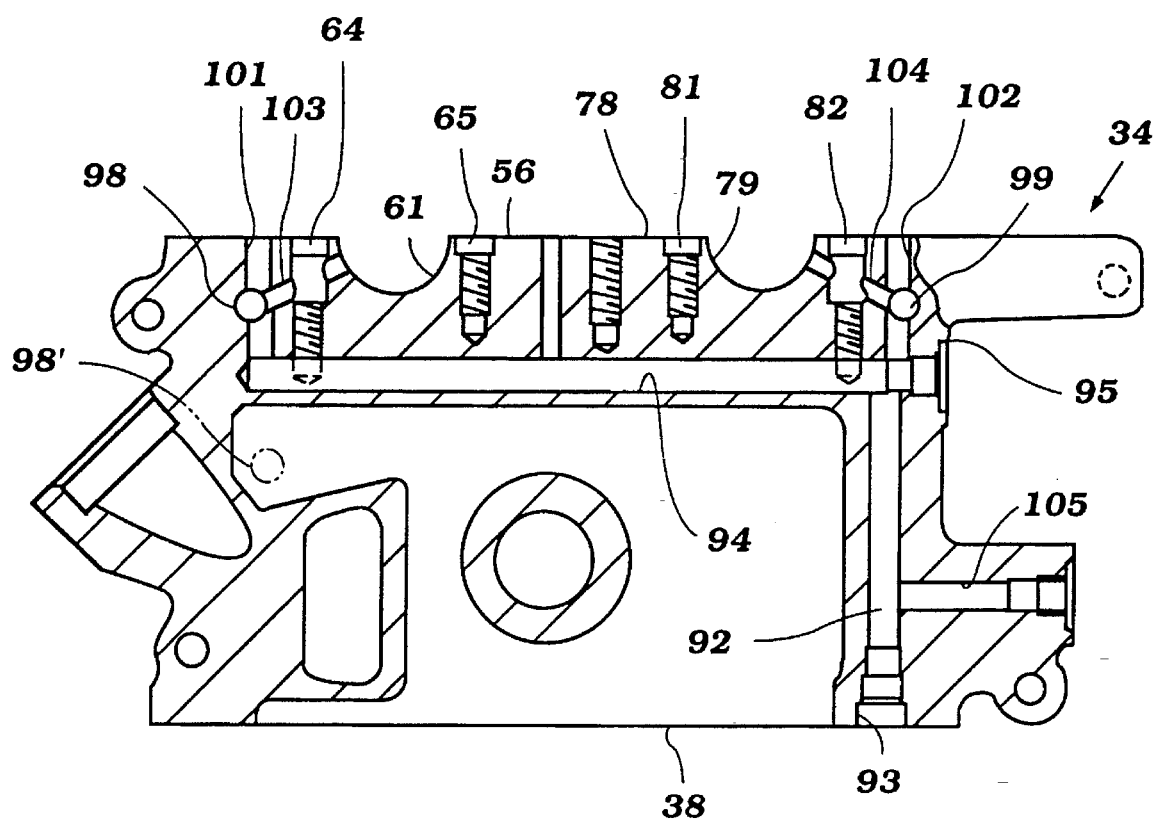
FIG. 9 is an enlarged cross-sectional view taken along the line 9—9 of FIG. 6.

Although the main galleries 98 and 99 in the illustrated embodiment are formed in the area above the lower ends of the fastener receiving openings 64 and 82, one or both of these main galleries may be formed lower in the cylinder head 34 as shown by the alternate location 98' in FIG. 9. Of course, this would require a change in configuration of the cylinder head 34 so as to perform metal to accommodate the cross drilling 94 in this area.

Referring now to FIGS. 2–8 it will be seen that the raised walls 55 and 75 that surround the respective tappet receiving bores 54 and 74 merge at the center of the cylinder head 34 as do the wall portions 59 and 78 in raised annular areas 106 in which spark plug wells 107 are formed. These spark plug wells 107 are inclined on the exhaust side of the cylinder head with the axis of the wells 107 being disposed at an angle $\theta_p$ to the plane containing the cylinder bore axis 41. This angle $\theta_p$ is less than the angle $\theta_e$ at which the exhaust valves 69 are inclined to this same plane. The lower ends of the wells 107 have tapped openings to receive spark plugs 108. As may be seen in FIG. 8, the area around the upper wall 106 inclines downwardly and merges into the upper cylinder head wall surface 106, this area being shown at 109.

As also seen in this figure, the distances a between the threaded fastener receiving holes 65 and the center of the upper portion of the well 107 and the corresponding distance b of the fastener receiving opening 81 are equal. This facilitates machining. It should be noted that the intake camshaft bearing caps 63 are staggered in an axial direction relative to the center of the spark plug well 107 and hence, these bearing caps may be affixed to the cylinder head walls 59 without interference with either the spark plug wells 107, the upper surfaces 106 or the cam cover 35.

The structure by which the cylinder heads 34 are affixed to the respective banks 23 and 24 of the cylinder block 22 will now be described by particular reference to FIGS. 4–8, 10, and 12 where this construction is best illustrated. This includes a first series of fastener receiving holes 111 formed on the intake side of the cylinder head and which are spaced equal distances from the cylinder bore axis 41. These fastener receiving openings 111 are spaced between the area of the upstanding walls 55 between adjacent cylinder bores 25. These openings 111 are spaced transversely outwardly from the tappet receiving bores 54 and are disposed outwardly from the axis of rotation of the intake cam shaft 57 which lies at a distance $L_1$ from the plane containing the cylinder bore axis 41.

The upper surfaces around these openings 111 is machined as at 112 so as to provide a good seating surface for the cylinder head fastener. This fastener may either comprise a bolt in which case the bolt head and washer engages the surface 112 or a stud in which case a cooperating nut and washer engages the surface 112.

In a like manner, there is provided a second series of fastener receiving openings 113 disposed on the exhaust side of the cylinder head 34. These openings 113 are disposed at equal distances from the cylinder bore axis 41 and at the same distance as the fastener receiving openings 111 on the intake side. It should be noted that the exhaust cam shaft 76 has its rotational axis disposed at a distance $L_2$ from the plane containing the cylinder bore axis 41 and this distance is greater than the distance $L_1$. Hence, the fastener receiving openings 113 on the exhaust side of the engine lie below the exhaust cam shaft 76.

The fastener openings 113 also are disposed between adjacent of the cylinder head walls 75 that surround the tappet bores 74 on the exhaust side of the engine. The area around the upper surface of the cylinder head adjacent the surface 56 around the fastener receiving openings 113 is machined at 114 for seating of the threaded fasteners, which may be of the type previously noted.

Figure 10:
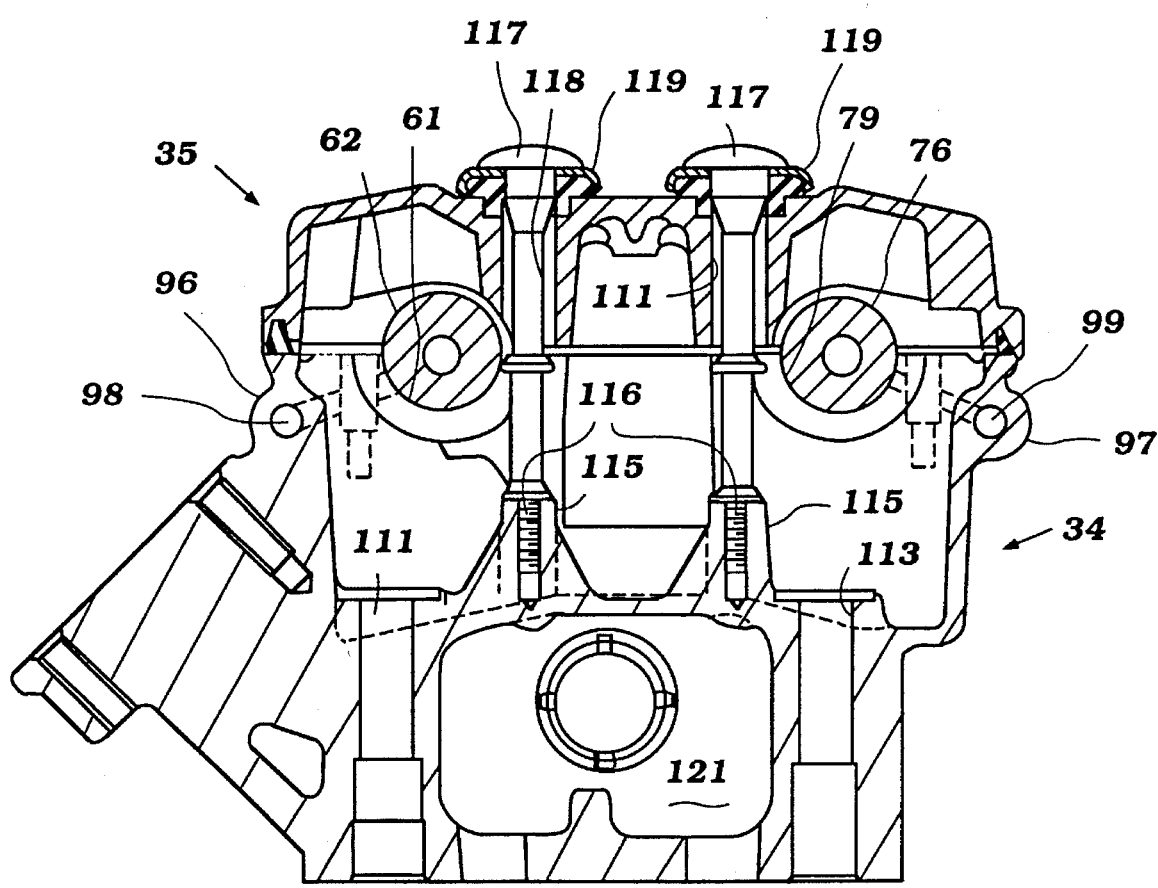
FIG. 10 is an enlarged cross-sectional view taken along the line 10—10 of FIG. 6, but shows the complete cylinder head assembly.
Figure 11:
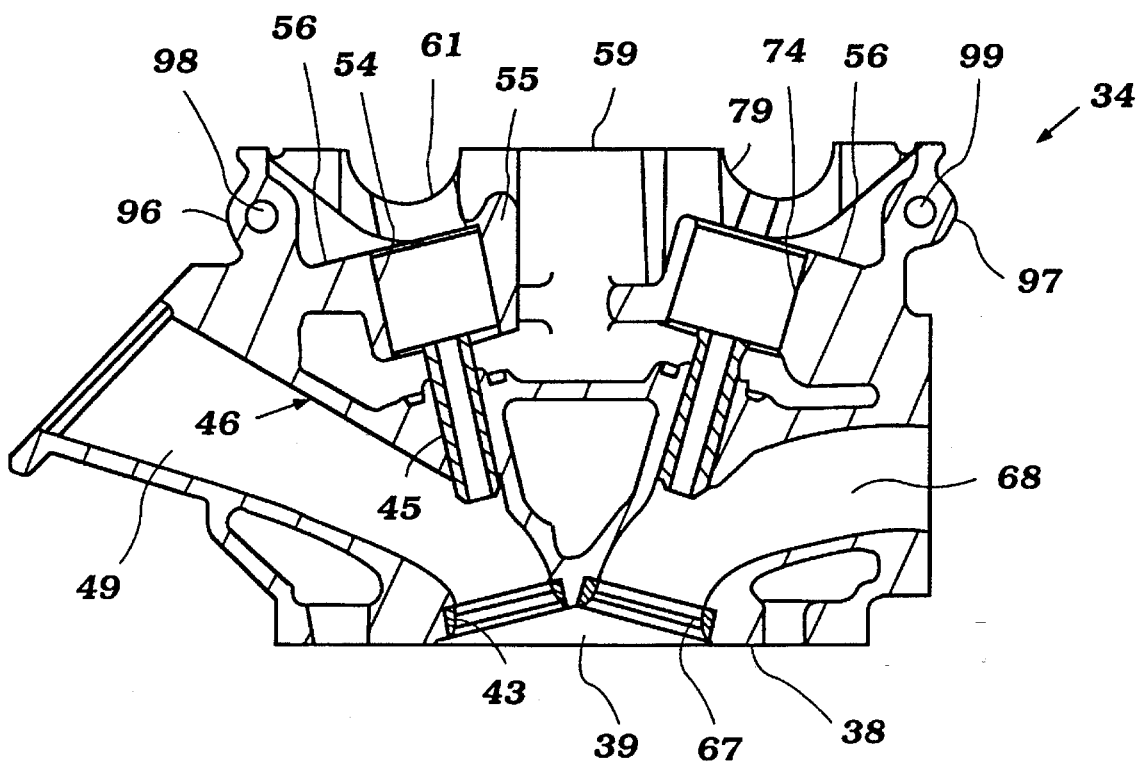
FIG. 11 is an enlarged cross-sectional view taken along the line 11—11 of FIG. 6.
Figure 12:
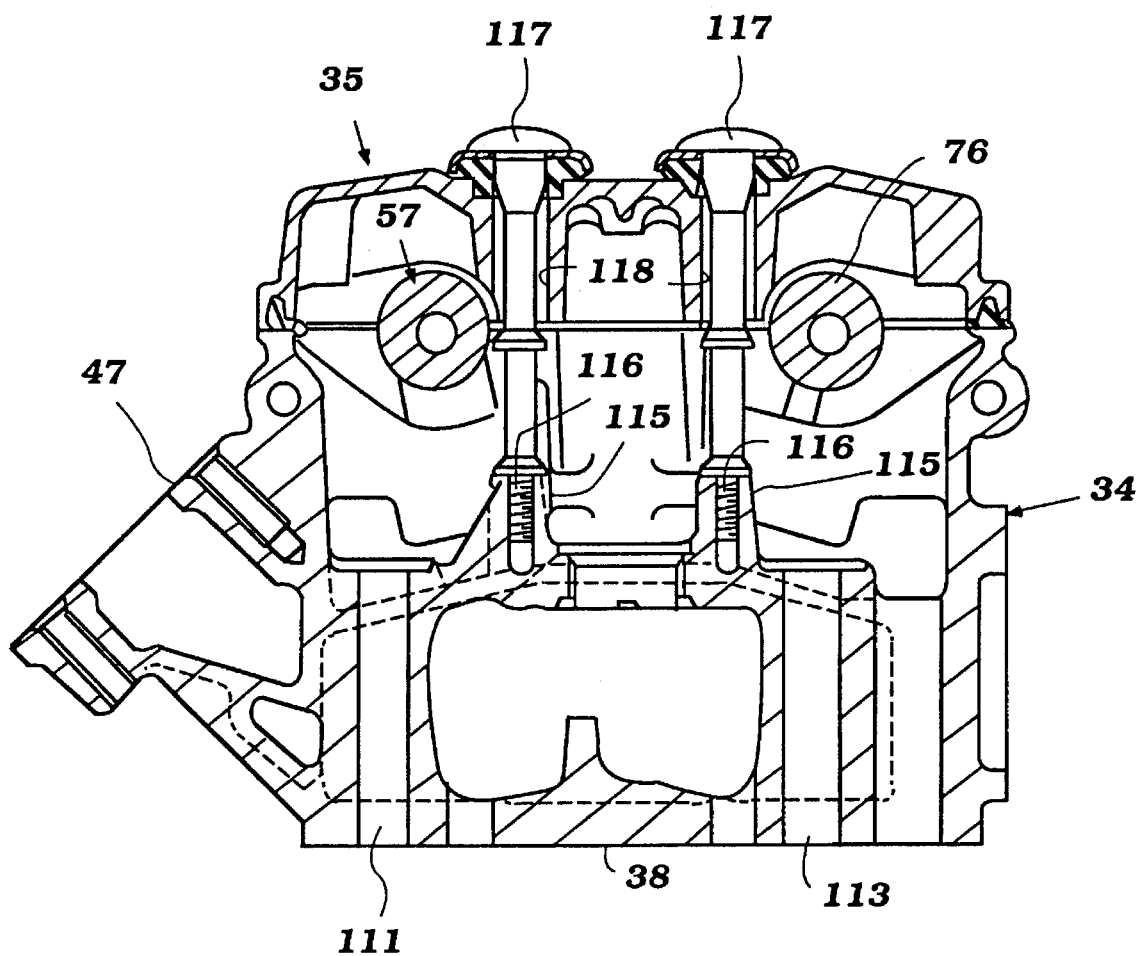
FIG. 12 is an enlarged cross-sectional view taken along the line 12—12 of FIG. 6, but shows the complete cylinder head assembly.

The way in which the cam covers 35 are affixed to the cylinder heads 34 will now be described by particular reference to FIGS. 10 and 12. It should be understood that certain components, particularly the threaded fastener receiving openings for the cam cover attachment appear in several of the other figures.

The cylinder head 34 and specifically its upper surface 56 is provided with a plurality of raised projections 115 that are disposed on opposite sides of the longitudinal center line and which are also disposed adjacent the fastener receiving openings 111 and 113 for fixing the cylinder heads 34 to the cylinder banks 23 and 24 of the cylinder block 22. Tapped openings 116 are formed in these raised portions 115. A plurality of threaded fasteners 117 have threaded lower ends that are received in these tapped openings 116. The threaded fasteners 117 pass through openings 118 in the cam cover 135 and sealing grommets 119 surround their upper ends so as to provide a detachable connection to the cylinder head 34. The heads of the fasteners 117 may be provided with sockets so that a tool can be employed to tighten and loosen them.

The engine 21 is liquid cooled and the cylinder head 34 is provided with a cooling jacket 121 (FIG. 3) that receives water from-the cylinder block cooling jacket through one or more passages 122.

Clean-out openings 123 (FIG. 5) are formed in the cylinder head 34 and extend into the cooling jacket 121 so that sand which may be employed as a core to form the cooling jacket during the casting process can be removed. After this clean-out operation, the clean-out openings 123 are closed in a suitable manner, as by welch plugs or the like.

The induction system 37 for the engine will now be described by primary reference to FIGS. 1, 2, and 14–18. As has been noted, this induction system 37 is positioned in the valley 36 between the cylinder banks 23 and 24 and cooperates with the cylinder head surfaces 47 for supplying a fuel air charge to the induction passages 48 and 49 of the cylinder heads 34.

The induction system 37 includes a plenum chamber, indicated generally by the reference numeral 124 and which extends generally longitudinally of the engine through the valley 36. The plenum chamber 124 is spaced from the cylinder block 22 and cylinder heads 34 so as to define an air path therearound through which air can circulate for cooling. This improves the volumetric efficiency of the engine.

The plenum chamber 124 is formed from a box-like member 125 that has its open lower face closed by a closure plate 126 that is affixed thereto by threaded fasteners 127 (FIG. 2). A throttle body 128 (FIGS. 14–16) is affixed to the front of the plenum chamber 124 and supplies air to its interior 129. The throttle body 128 receives air from a suitable air inlet device (not shown) and has an inlet opening 131 in which a pair of flow controlling throttle valves 132 are supported for rotation on respective throttle shafts 133. The throttle valves 132 are operated by a suitable external accelerator control and open in unison.

The throttle body 128 has a curved section 134 downstream of the throttle valves 133 and which blends into the plenum chamber 124 so as to deliver the air to its internal chamber 129. Various types of sensors such as a temperature sensor and/or air flow sensor (not shown) may be associated with the throttle body 128 for sensing the condition and volume of the air inducted.

The upper end of the box-like member 125 is closed by a top plate 135 which is affixed thereto also by the fasteners 127 and further fasteners 136. This top plate 135 forms the terminal end of an intake manifold assembly, indicated generally by the reference numeral 137 and which includes a plurality of runner sections, indicated generally by the reference numeral 138 which all have common flanges 139 that are affixed to a control valve assembly, indicated generally by the reference numeral 141 at each cylinder head surface 47. From the flanges 139, the runner sections 138 include tubular portions that extend upwardly and then transversely across the valley 36 and turn downwardly at a reentrant portion 142 that enters the plenum chamber 124 through the plate 136.

Intake trumpets 143 of tuned lengths have flange portions 144 that are affixed to the underside of the plenum chamber plate 135 and extend into the plenum chamber volume 129. The length of the trumpets 143 and runners 138 and their cross sections is chosen to provide optimum efficiency for the engine induction. The air flows through the induction system as shown by the arrows in FIG. 2.

It should be noted that the manifold runners 138 are spaced from each other and define an air gap 145 (FIG. 2) so that air can flow both across the top of the plenum chamber 124 and around the manifold runners 138 for their cooling. Further air flow recesses 146 are formed on the outer peripheral sides of the reentrance sections 142 of the runner tubes of the runners 138.

Although it is not a functional part of the plenum chamber 124, the plenum chamber unit 124 also provides a mounting cavity 147 on each side thereof in which a respective knock sensor 148 is positioned. The knock sensors 148 are employed in conjunction with the ignition control system for the engine for controlling the ignition timing to prevent or retard knocking conditions. Since this structure forms no part of the invention, a further description of it is not believed to be necessary.

Figure 15:
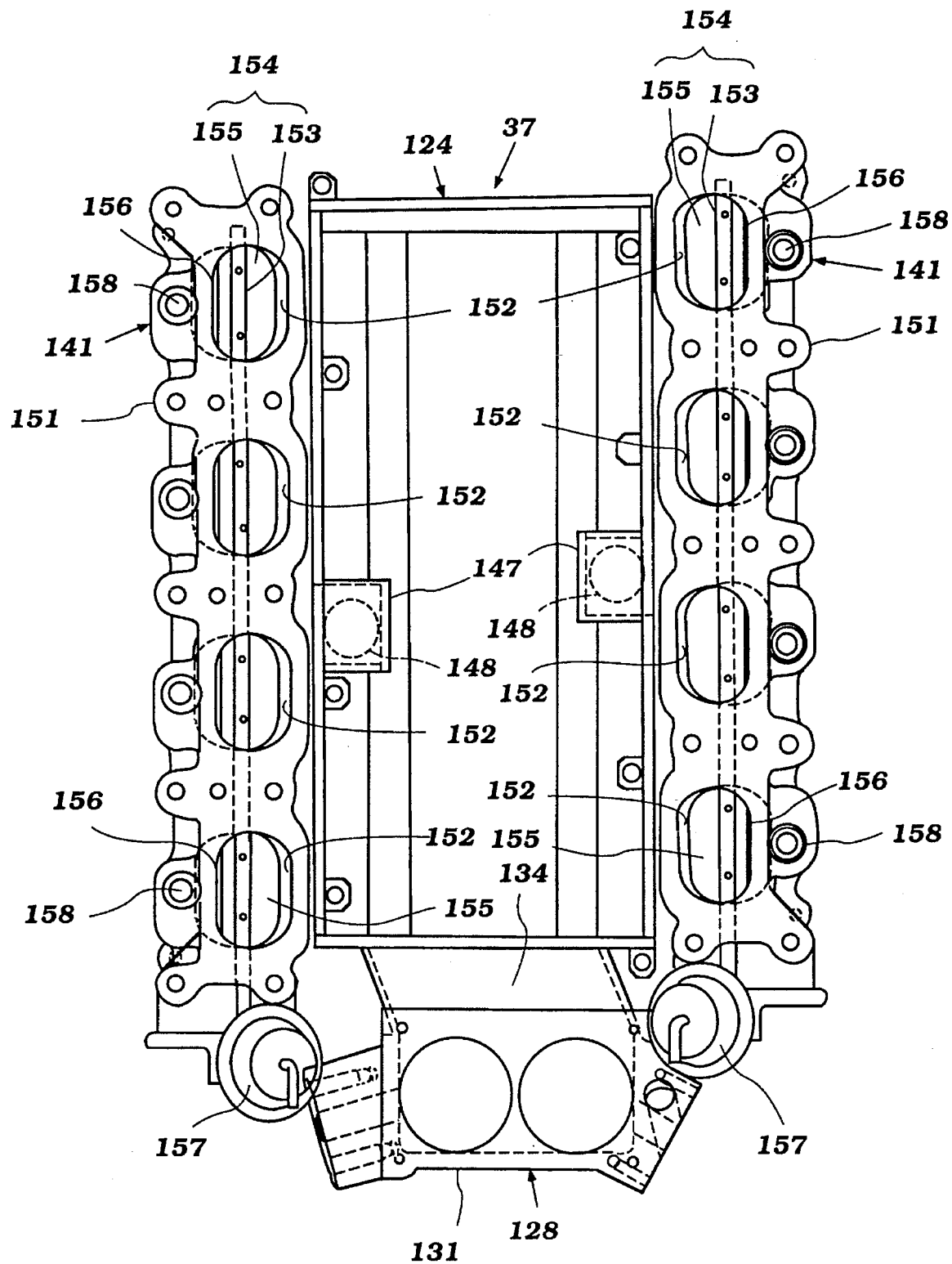
FIG. 15 is a view of the intake manifold and throttle valve assembly taken along the line 15—15 of FIG. 2.
Figure 16:
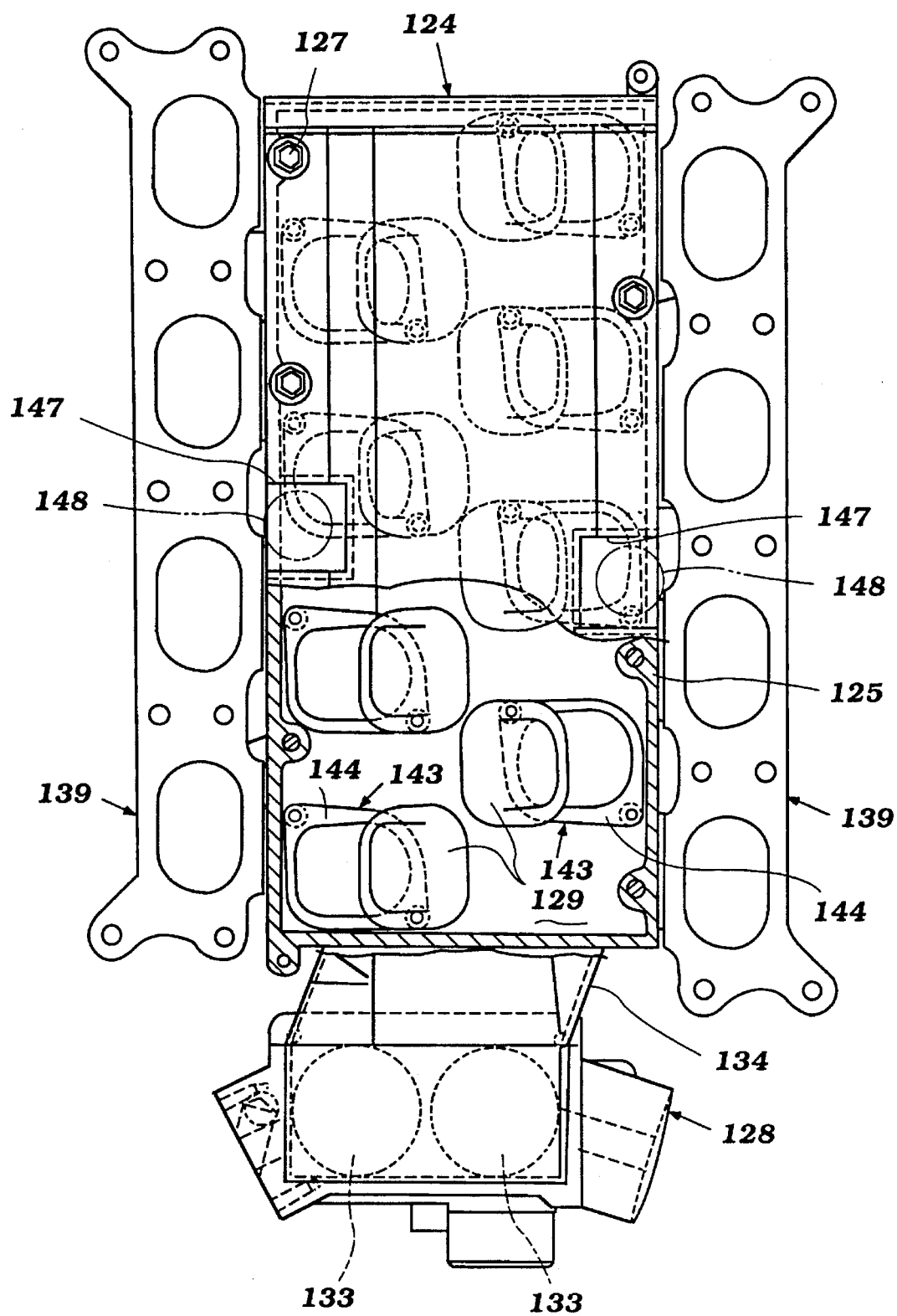
FIG. 16 is a bottom plan view, with a portion broken away, of the structure shown in FIG. 15, but deleting the flow-controlling valves and showing the interior configuration of the plenum chamber for the intake manifold.
Figure 17:
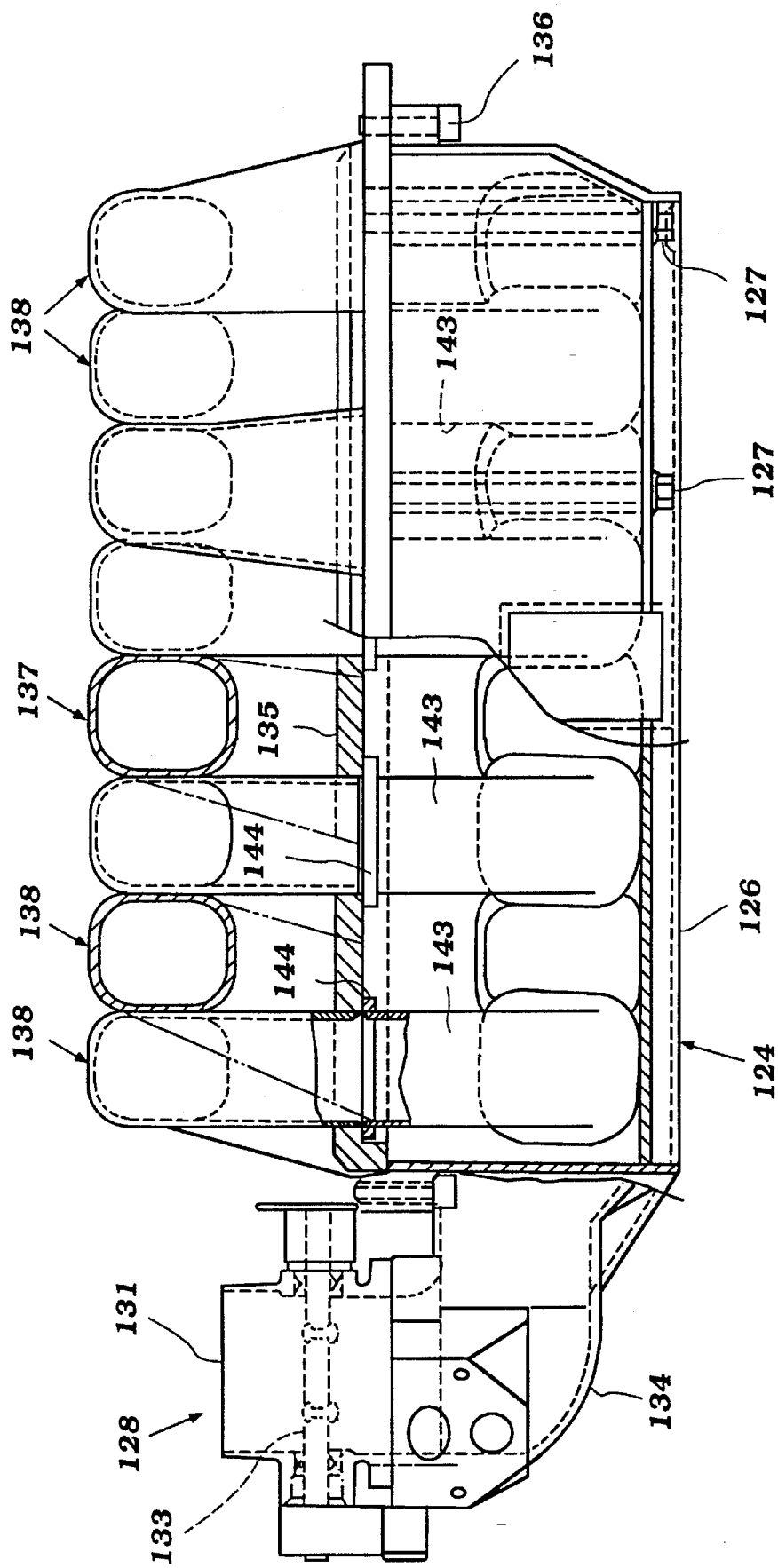
FIG. 17 is an enlarged side elevational view of the intake manifold and throttle valve assembly, with a portion broken away and shown in section.
Figure 18:
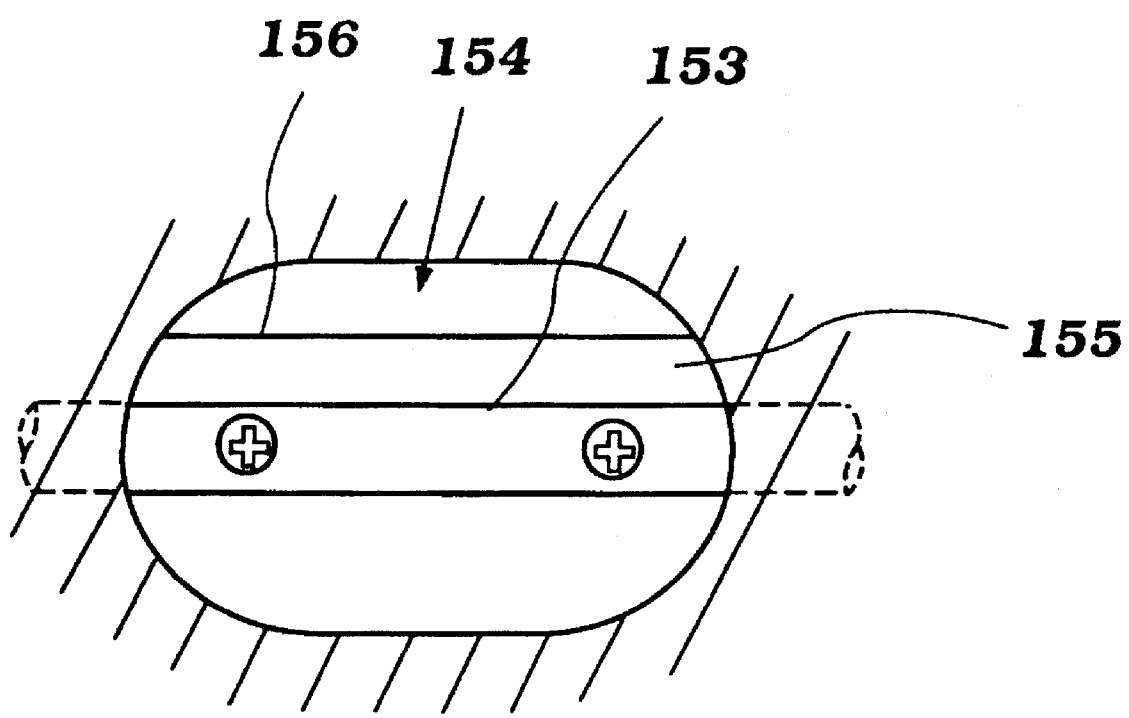
FIG. 18 is an enlarged cross-sectional view showing one of the throttle-controlling valves.

The construction of the control valve assemblies 141 will now be described by reference to FIGS. 2, 15, and 18. It should be noted that the induction system 37 as thus far described and the configuration of the cylinder head induction passages 48 and 49 are such that the charge that enters the combustion chambers will flow relatively smoothly and with a relatively small amount of turbulence. However, the positioning of the side intake valve seats 42 is such that the air flow into the combustion chambers from them will have some tumble type motion. However, the induction system per se is designed so as to minimize flow restrictions to maximize volumetric efficiency. This, however, may give rise to poor or low speed running characteristics wherein turbulence is desirable.

The control valve assemblies 141 are employed so as to redirect the charge and give a turbulence factor to it. The control valve assemblies 141 each include a valve body 151 which, as has been noted, is interposed between the manifold runners 138 and the induction passages 48 and 49 of the cylinder heads 34. This body 151 is formed with flow passages 152 that are generally complementary to the configuration of the combined shape of the intake passages 48 and 49 and specifically their shape in the cylinder head surfaces 47.

A control valve shaft 153 of a control valve assembly 154 is journaled in each body 151 and extends transversely across the passages 152. Plate-type control valves 155 are affixed to this shaft 153 and complete the control valve assembly 154. It should be noted that the plate type valves 155 are provided with cut-outs 156 that are disposed on one side thereof. Hence, when the control valve assembly 154 is in its closed position, as shown in FIG. 2, the intake charge flowing through the induction system 37 will be directed toward the side of the valve seats 42 and 43 closest to the cylinder bore axis 41. This will then cause the air to enter the combustion chambers and specifically the combustion chamber recesses 39 in a direction to create a tumble motion in the cylinders.

Vacuum-type servo motors 157 are affixed to the ends of the valve bodies 151 and are operated by a suitable ECU or other control arrangement so as to close the valve assemblies 154 at low and mid-range speeds so as to generate this turbulence. At high speed and high loads, however, the control valves 154 are positioned in their full open position and hence will generate little restriction to air flow and maximum volumetric efficiency.

Finally, the control valve assembly 141 and specifically the valve body 151 is provided with a plurality of injection nozzle openings 158 which receive suitable fuel injectors such as electrically operated fuel injectors 159. The fuel injectors 159 are fed by fuel rails 161 and spray fuel into one side of the intake passages 48 and 49. This spray is on the side where the cutout 156 of the control valves 155 is positioned so that when the control valve assembly 154 is in its tumble-generating position as shown in FIG. 2, the turbulent air flow will pass the spray from the nozzles 159 and effect good fuel/air mixing.

It should be readily apparent from the foregoing description that the described engine and specifically its cylinder head construction permits a very compact assembly and yet permits the valve actuating tappets, the valves themselves and the cam shafts all to be supported in a single cylinder head casting. Of course, the foregoing description is that of a preferred embodiment of the invention and various change and modifications may be made without departing from the spirit and scope of the invention, as defined by the appended claims.

We claim:

1. A cylinder head for a multi-valve internal combustion engine having a lower surface for sealing engagement with a cylinder block around a cylinder bore, an upper surface spaced from said lower surface, said upper cylinder head surface defining a first set of three tappet receiving bores on one side of a longitudinally extending plane, each of said first set of tappet receiving bores being adapted to slidably receive a respective tappet for actuating a valve serving said cylinder bore, a first wall upstanding from said upper cylinder head surface above said first set of tappet receiving bores and encircling said first set of tappet receiving bores, a second set of two tappet receiving bores on the other side of said plane for receiving a respective tappet for activating a valve serving said cylinder bore, and a second wall upstanding from said upper cylinder head upper surface above said second set of tappet receiving bores and encircling said second set of tappet receiving bores.

2. The cylinder head for a multi-valve internal combustion engine as set forth in claim 1, further including at least one cross wall extending between respective pairs of tappet receiving bores and between each of said first and said second walls for journaling a cam shaft for operating the respective tappets received in the tappet receiving bore surrounded by the respective one of said walls.

3. The cylinder head for a multi-valve internal combustion engine as set forth in claim 2, wherein there are a pair of cross walls associated with the first wall each disposed between a pair of the tappet receiving bores.

4. The cylinder head for a multi-valve internal combustion engine as set forth in claim 2, wherein there is a single cross wall associated with the second wall and disposed between the second set of tappet receiving bores.

5. The cylinder head for a multi-valve internal combustion engine as set forth in claim 4, wherein there are a pair of cross walls associated with the first wall each disposed between a pair of the tappet receiving bores.

6. The cylinder head for a multi-valve internal combustion engine as set forth in claim 1, further including a third upstanding wall disposed between the first and second walls and defining a spark plug well for receiving a spark plug for firing a charge in the cylinder bore.

7. The cylinder head for a multi-valve internal combustion engine as set forth in claim 6, wherein the upper ends of the first, second, and third walls are substantially coextensive.

8. The cylinder head for a multi-valve internal combustion engine as set forth in claim 7, further including at least one cross wall extending between respective pairs of tappet receiving bores between said first and said second walls for journaling a cam shaft for operating the respective tappets received in the tappet receiving bore surrounded by said walls.

9. The cylinder head for a multi-valve internal combustion engine as set forth in claim 8, wherein the cross walls further merge into the third wall.

10. The cylinder head for a multi-valve internal combustion engine as set forth in claim 9, wherein there are a pair of cross walls associated with the first wall each disposed between a pair of the tappet receiving bores.

11. The cylinder head for a multi-valve internal combustion engine as set forth in claim 9, wherein there is a single cross wall associated with the second wall and disposed between the second set of tappet receiving bores.

12. The cylinder head for a multi-valve internal combustion engine as set forth in claim 11, wherein there are a pair of cross walls associated with the first wall each disposed between a pair of the tappet receiving bores.

13. The cylinder head for a multi-valve internal combustion engine as set forth in claim 1, wherein the cylinder head closes a plurality of cylinder bores in the cylinder block and wherein there are first and second walls and first and second sets of tappet receiving bores provided for each of said cylinder bores and further including hold-down fastening apertures formed between adjacent sides of said first and second walls for receiving threaded fastening means for affixing said cylinder head to the cylinder block.

14. The cylinder head for a multi-valve internal combustion engine as set forth in claim 13, further including at least one cross wall extending between respective pairs of tappet receiving bores between each of the first and said second walls for journaling a cam shaft for operating the respective tappets received in the tappet receiving bore surrounded by said walls.

15. The cylinder head for a multi-valve internal combustion engine as set forth in claim 13, further including a plurality of bearing caps affixed to the cross walls for journaling the cam shafts therein.

16. The cylinder head for a multi-valve internal combustion engine as set forth in claim 15, further including a third upstanding wall disposed between the first and second walls and defining a spark plug well for receiving a spark plug for firing a charge in the cylinder bore and wherein the threaded fastening means affix the bearing caps to the bearing supporting walls adjacent the spark plug well and are all located at equal distances from the spark plug well.

17. The cylinder head for a multi-valve internal combustion engine as set forth in claim 16, wherein there are a pair of cross walls associated with each first wall, each cross wall being disposed between a pair of the tappet receiving bores.

18. The cylinder head for a multi-valve internal combustion engine as set forth in claim 16, wherein there is a cross wall associated with the second wall and disposed between the second set of tappet receiving bores.

19. The cylinder head for a multi-valve internal combustion engine as set forth in claim 18, wherein there are a pair of cross walls associated with the first wall each disposed between a pair of the tappet receiving bores.

20. The cylinder head for a multi-valve internal combustion engine as set forth in claim 19, wherein the upper ends of the first, second, and third walls and all of the cross walls are coextensive.

\* \* \* \* \*